Patented Dec. 7, 1926.

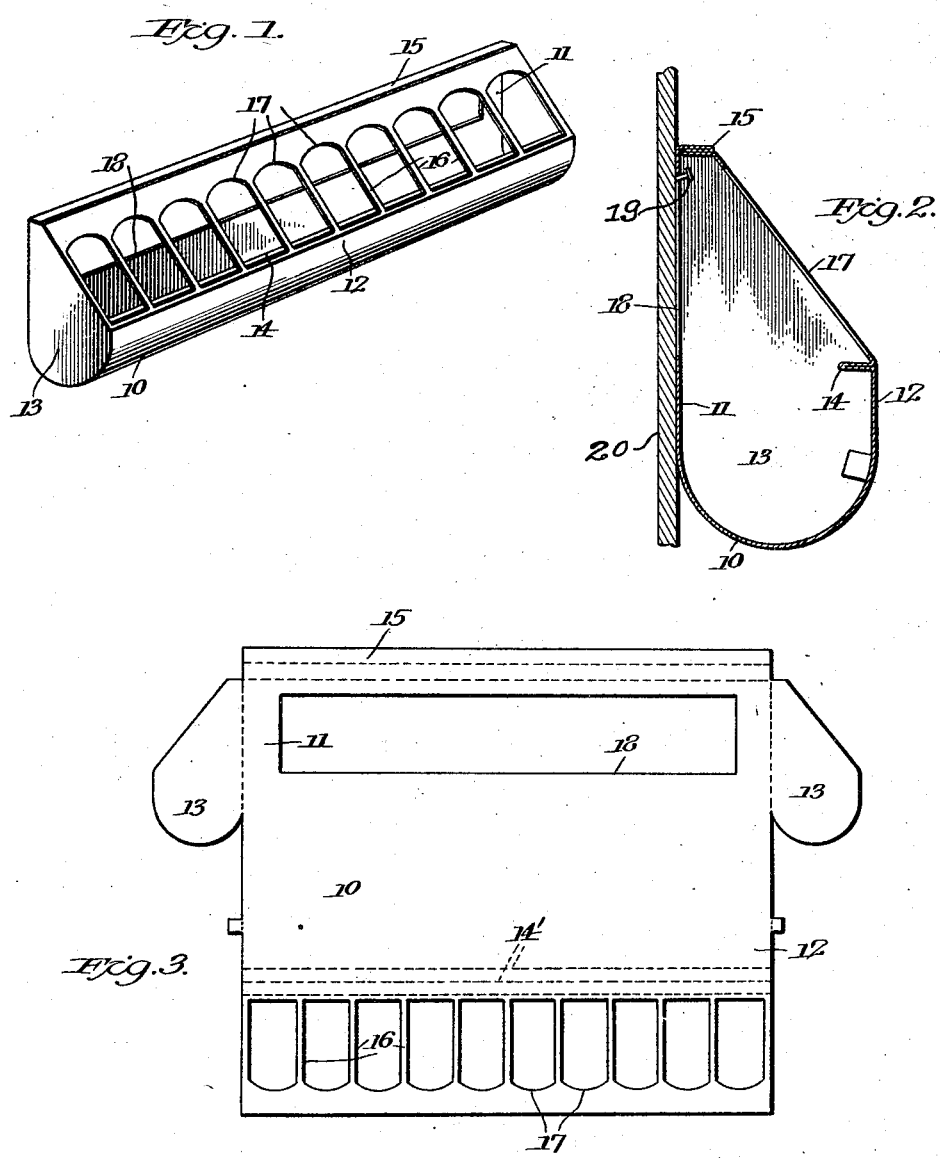

1,610,176

UNITED STATES PATENT OFFICE.

RICHARD HALLETT STABLER, OF KENNETT SQUARE, PENNSYLVANIA.

SANITARY, NO-WASTE CHICK FEEDER.

Application filed April 28, 1925. Serial No. 26,473.

This invention relates to poultry feeders, and aims generally to improve such feeders by providing means for preventing the fowl from contaminating or wasting the food.

In the accompanying drawings wherein one embodiment of my invention is selected for illustrative purposes—

Fig. 1 is a perspective view of my improved feeder,

Fig. 2 is a cross sectional view thereof, and

Fig. 3 is a plan view of a suitable sheet metal blank from which the improved feeder may be made.

In the illustrative embodiment of my invention shown in the drawings, the feeder comprises a trough having an arcuate bottom 10, vertical rear or back wall 11, and front wall 12, and ends 13 closing the end portion of the trough and bridging the space between the back and front walls 11 and 12. As shown in the drawings, the bottom 10 is preferably of substantially semi-circular cross section, one edge of which terminates in the back wall 11 extending upwardly a considerable distance above the bottom and the other edge terminating in a relatively low front wall 12. Preferably the upper edge of the back wall 11 extends above the upper edge of the front wall 12 a distance greater than the distance between the walls 11 and 12. The front wall 12, and the ends 13 support a deflector 14, preferably formed as an inwardly extending horizontal flange integral with the front wall, thereby to provide a means for preventing waste of food by the feeding fowl. In practice I prefer to form the deflector 14 by reversely binding the material along parallel lines 14'; to provide a deflector of double thickness, thereby adding strength and rigidity to the device. The back wall is preferably formed, at the upper edge thereof, with an inwardly extending reinforcing flange 15, preferably of double thickness, thereby to strengthen the feeder.

It is desirable to provide a completely sanitary feeder, that is, one upon which the fowl may not perch and leave droppings in the trough, and at the same time keep the feeder open to permit the fowl to feed readily therein, and to enable it to be filled with the least trouble. To these ends I have provided a plurality of spaced guards 16, bridging the opening between the upper edge of the back wall 11 and the waste preventing deflector 14, and connected thereto at the ends to form a rigid structure. These guards are so constructed and arranged as to provide spaces 17 between them of a size sufficient only to permit the entrance of the head of the fowl; the location and slope are such as to prevent any possibility of the fowl perching upon the flange 14. I find that satisfactory results are obtained when the lower ends of the guards 16 are flush with the outer edge of the deflector 14, and the angle of inclination is between 45 and 90 degrees to the horizontal.

My improved feeder may be made from a single stamping of sheet metal or other suitable material, and as shown in Fig. 3, the stamping comprises a substantially rectangular piece of material to form the front, back, bottom and top, with the end pieces 13 formed integrally with and extending from the side edges of the rectangular sheet. The guards 16 are also formed of the same rectangular sheet by cutting the openings 17 therefrom, near one end of the sheet, preferably the lower portion thereof as shown. These guards may be of any desired shape, but preferably are of a shape to permit the passage of only the chick's head therethrough.

A cleaning opening 18 may be cut from that portion of the sheet material which forms the rear wall 11, and preferably the opening 16 is so arranged that the lower edge thereof is in approximately the same place with the upper edge of the front wall 12. The opening 18 also serves as means for removably supporting the feeder upon suitable supporting means 19, secured to a wall or other support 20.

My invention is especially adaptable to the feeding of chicks under the present approved methods of feeding, which requires periodically filling the troughs for each feeding and starving the chicks between feeding periods of definite duration. Hence my invention is to be distinguished from the "hopper type" of feeders which are intended to hold a large supply of feed and to continuously supply the feed to the feeding trough.

Further advantages of my invention are the provision of a feeder so constructed as to maintain the feed in a highly sanitary condition free from contamination by droppings; one which can be readily filled and cleaned and which will prevent waste of the food by the feeding chicks; one which is adapted to be removably supported on a wall so that it may be readily adjusted in height to meet the requirements as the chicks increase in size, and one which may be made from a single piece of sheet material, thus providing an extremely simple construction, cheap in the cost of manufacture and durable in use.

My invention obviously is not restricted to the details of construction shown in the drawings. Although it may be desirable to make the feeder from a single sheet metal stamping, in many instances it would be found desirable to make the cover or guard member as a separate piece from the trough member and my invention is intended to be applicable to both of these constructions.

I claim—

1. A sanitary, no-waste, poultry feeder comprising a trough having an arcuate bottom, an upwardly extending rear wall adapted to be removably supported upon a vertical wall or the like, said trough terminating on its front side in an inwardly extending means to prevent waste of the contents of the feeder, and guard means including a partially open one-piece member bridging the space between the upper edge of the back and the forward edge of said inwardly extending means and so spaced and arranged as to prevent perching of the fowl upon any portion of the feeder.

2. A sanitary, no-waste, poultry feeder adapted to be removably supported upon a wall or the like, comprising a trough having an arcuate bottom and upwardly extending front and rear walls, said rear wall extending above the upper edge of the front wall a distance greater than the distance between the walls, an inwardly extending means adjoining the upper edge of said front wall to prevent waste of the contents of the feeder, and integrally connected spaced guard means bridging the space between the upper edge of the rear wall and the forward edge of said waste preventing means, said guard means being so spaced and arranged as to prevent perching of the fowl upon the feeder and to permit only of the entrance of the fowl's head in the spaces between the guard means.

3. A sanitary, no-waste, poultry feeder comprising a trough having an arcuate bottom, an upwardly extending rear wall adapted to be removably supported upon a wall or the like, said trough terminating on its front side in an inwardly extending means to prevent waste of the contents of the feeder, and guard means rigidly attached to and bridging the space between the upper edge of the back and said inwardly extending means said guard means comprising an open-work member and so spaced and arranged as to prevent perching of the fowl upon any portion of the feeder.

4. A sanitary, no-waste, poultry feeder adapted to be removably supported upon a wall or the like, comprising a trough having an arcuate bottom and upwardly extending front and rear walls, said rear wall extending above the upper edge of the front wall a distance greater than the distance between the walls, an inwardly extending means adjoining the upper edge of said front walls to prevent waste of the contents of the feeder, and spaced guard means comprising an openwork member bridging the space between the upper edge of the rear wall and the forward edge of said waste preventing means, said guard means being so spaced and arranged as to prevent perching of the fowl upon the feeder and to permit only of the entrance of the fowl's head in the spaces between the guard means.

5. A sanitary, no-waste wall-supported chick feeder having an arcuate bottom and upwardly extending front and rear walls, end walls, the upper edges of the front and rear walls terminating in inwardly extending lips, and guard means comprising an openwork structure formed from a single piece of material securely attached to said inwardly extending lips to bridge the space between the upper edges of the rear wall and front wall and so constructed and arranged as to prevent perching of the fowl upon the feeder and to permit only of the entrance of the fowl's head between the guards, the inwardly extending lips on the upper edge of the front wall also serving to prevent accidental displacement of food from the feeder by the feeding chicks.

6. A sanitary, no-waste, wall-supported chick feeder having an arcuate bottom and upwardly extending front and rear walls, the rear wall extending upwardly a considerable distance above the front wall, the upper edges of the front and rear walls being formed with inwardly extending guard supporting lips, and guard means comprising an openwork structure formed from a single piece of material attached to the inwardly extending lips of the front and rear wall, the inclination of said guard means being preferably greater than but not less than 45° to the horizontal, said guard means being constructed and arranged to prevent perching of the fowl upon the feeder and to permit only of the entrance of the fowl's head between the guards, the inwardly extending lips on the front wall also serving to prevent accidental displacement of food from the feeder by the feeding fowl.

In testimony whereof, I have signed my name to this specification.

RICHARD HALLETT STABLER.